United States Patent Office 3,441,585
Patented Apr. 29, 1969

3,441,585
COPOLYMERIC ORGANOPOLYSILOXANE
LUBRICANT COMPOSITION
Edgar D. Brown, Jr., Schenectady, N.Y., assignor to General Electric Company, a corporation of New York
No Drawing. Filed Dec. 12, 1966, Ser. No. 600,767
Int. Cl. C07f 7/08; C10m 1/50
U.S. Cl. 260—448.2           5 Claims This invention relates to a new organopolysiloxane composition of improved lubricating characteristics. In particular, this invention relates to liquid organopolysiloxane compositions containing silicon-bonded higher alkyl radicals, silicon-bonded haloalkyl radicals, and silicon-bonded phosphono radicals.

In my copending application Ser. No. 421,588 filed Dec. 28, 1964, and assigned to the same assignee as the present invention, there is described a class of organopolysiloxanes useful for many purposes which comprise triorganosilyl chain-stopped diorganopolysiloxanes in which each silicon atom contains a silicon-bonded higher alkyl radical. These materials have very good lubricating characteristics under moderate conditions, but when these compositions are subjected to extreme pressure lubricating conditions, particularly when lubricating movement between two stainless steel parts, the fluids are not as good as desired in lubricating properties.

In my copending application Ser. No. 600,768 (Docket 8DW-405) filed concurrently herewith and assigned to the same assignee as the present invention, there is described copolymeric organosilicon compositions which contain both silicon-bonded higher alkyl radicals and silicon-bonded chloroalkyl radicals. These compositions exhibit superior extreme pressure lubricating characteristics to the compositions of application Ser. No. 421,588. However, the lubricating characteristics of this copolymer are still not as high as desired. Furthermore, such compositions do not have as high a degree of flame retardancy as desired.

The present invention is based on my discovery of copolymeric organopolysiloxanes which have improved lubricity under extreme pressure lubricating compositions and which have improved flame retardancy. These compositions comprise triorganosilyl chain-stopped disorganopolysiloxanes containing an average of from about 4 to 40 diorganopolysiloxane units per molecule, with each diorganosiloxane unit containing one silicon-bonded methyl group, with from about 50 to 88 percent of the silicon atoms also containing one silicon-bonded higher alkyl radical containing at least eight carbon atoms, with from about 10 to 40 percent of the silicon atoms containing one silicon-bonded chloroalkylradical of from 2 to 6 carbon atoms, and with 3 to 25 percent of the silicon atoms containing one dialkylphosphono group attached to silicon through a phosphorous-oxygen-silicon linkage.

The liquid organopolysiloxanes within the scope of the present invention can be characterized as having the formula:

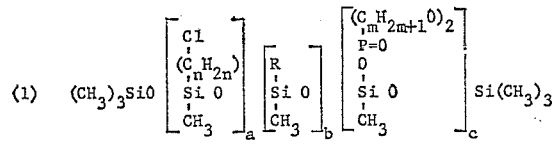

where R is an alkyl radical containing at least 8 carbon atoms, e.g., from 8 to 18 carbon atoms; the sum of $a$ plus $b$ plus $c$ is equal to from about 4 to 40, inclusive; the ratio of $a$ over $a$ plus $b$ plus $c$ has an average value of from 0.10 to 0.40, inclusive; the ratio of $b$ over $a$ plus $b$ plus $c$ has an average value of from 0.50 to 0.88, inclusive, where the ratio of $c$ over $a$ plus $b$ plus $c$ has an average value of from 0.03 to 0.25, inclusive; $n$ is an integer equal to from 2 to 6, inclusive, and $m$ is an integer equal to from about 2 to 10, inclusive.

From the definition of the various substituents of Formula 1, it is apparent that the radicals represented by R can vary from octyl to octadecyl. In the preferred embodiment of my invention, R represents a tetradecyl radical. It is also apparent from Formula 1 that the chloroalkyl radical can vary from chloroethyl through chlorohexyl. In the preferred embodiment of my invention, the chlorine atom is attached to an omega carbon atom of the chloroalkyl radical but, in any event, the colorine atom is preferably attached to a carbon atom other than a carbon atom attached directly to silicon. The alkyl radical itself is preferably a normal alkyl radical, but the use of compositions containing radicals other than the normal alkyl radical is not precluded. The preferred chloroalkyl radical is the chloropropyl radical. The dialkylphosphono radical in Formula 1 is preferably the bis-2-ethylhexyl-phosphono radical, but as described above, the two dialkyl radicals can contain from 2 to 10 carbon atoms.

The compositions within the scope of Formula 1 can be prepared by relatively straightforward techniques. The simplest method of preparing these materials is by the co-hydrolysis and co-condensation of a mixture of chlorosilanes. In particular, ingredients are mixed in the ratio of 2 moles of trimethylchlorosilane, $a$ moles of a methylchloroalkyldichlorosilane having the formula:

(2) 

and $b$ plus $c$ moles of methyl hydrogen dichlorosilane. This mixture is hydrolyzed by slowly adding the mixture to an excess of water, for example a three-fold volume excess of water, stirring the reaction mixture at room temperature, allowing the mixture to settle into a silicone phase and an aqueous phase, removing the aqueous phase, washing the silicone phase with water until neutral, and then drying over sodium sulfate to produce a polysiloxane fluid having the formula:

(3) 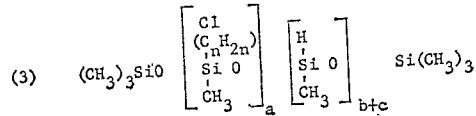

The polysiloxane of Formula 3 can be converted to a polysiloxane having the formula:

(4) 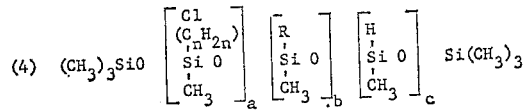

by the addition of the appropriate alpha-olefin to the composition of Formula 3. The appropriate alpha-olefins are alpha-olefins having the formula:

(5)           

where R' is an alkyl radical containing from 6 to 16 carbon atoms. The particular alpha-olefins within the scope of Formula 5 are illustrated, for example, by octene-1, decylene-1, dodecylene-1, tetradecylene-1, hexadecylene-1, and octadecylene-1.

The reaction between the alpha-olefin of Formula 5 and the polysiloxane of Formula 3 is carried out in the same manner as the same type of reaction described in my aforementioned copending application Ser. No. 421,588, which is incorporated by reference into the present application for details of such reaction. In particular, the reaction involves components in the ratio of one mole of the polysiloxane of Formula 3 and $b$ moles of the alpha-olefin to produce the polysiloxane within the scope of Formula 1 which contains silicon-bonded hydrogen groups, silicon-bonded chloroalkyl radicals, and silicon-bonded higher alkyl radicals. Because a specified proportion of the silicon-bonded hydrogens of the polysiloxane of Formula 3 are to be converted to silicon-bonded higher alkyl groups, the ratio of components is carefully controlled in the amounts described above.

The reaction of the alpha-olefin of Formula 5 with the polysiloxane of Formula 3 is carried out in the presence of conventional SiH-olefin addition catalysts, such as those elemental platinum catalysts described in Patent 2,970,150, Bailey, as well as the platinum compound catalysts described in Patents 2,823,218, Speier et al.; 3,159,601, Ashby; 3,159,662, Ashby; and 3,220,972, Lamoreaux. The amount of SiH-olefin addition catalyst employed in effecting reaction between the SiH-containing polysiloxane of Formula 3 and the alpha-olefin of Formula 5 can vary within wide limits. Generally the catalyst is employed in an amount sufficient to provide one mole of platinum per 1,000 moles of the alpha-olefin to one mole of catalyst per million moles of alpha-olefin. Generally, a mixture is formed of the hydrogen-containing polysiloxane of Formula 3 and a portion of the alpha-olefin of Formula 5 is added and then the catalyst is added. The temperature of the reaction mixture is increased until the rate of temperature rises becomes greater than that supplied by the heating element, and thereafter the temperature is maintained by controlling the rate of addition of the remaining alpha-olefin. Generally, the reaction temperature is maintained at about 50 to 120° C.

The polysiloxane of Formula 4 is converted to the compositions of the present invention within the scope of Formula 1 by reacting the polysiloxane of Formula 4 with a monoacid dialkyl orthophosphate having the formula:

(6) $\qquad (C_mH_{2m+1}O)_2P(O)OH$

The reaction involves reactants in the ratio of one mole of the polysiloxane of Formula 4 with $c$ moles of the orthophosphate. The reaction is catalyzed by the same elemental platinum or platinum compound catalyst used to catalyze the addition of the alpha-olefin to the polysiloxane of Formula 3. The reaction involves the elimination of hydrogen from the orthophosphate and the siloxane, with the formation of a phosphorous-oxygen-silicon linkage. In general, the reaction is effected by maintaining the reaction mixture at a temperature of about 100° C. for 30 minutes and the reaction mixture is then permitted to cool to room temperature to produce the compositions within the scope of the present invention. The compositions of the present invention are generally clear, colorless liquids which have viscosities which vary from 100 to 500 centistokes at 100° F., depending upon the molecular weight of the composition and the particular substituents on the silicon atoms.

In order to evaluate the lubricating characteristics of the materials of my invention, they were subjected to the standard Four-Ball Wear test which involves a device for holding three rigidly clamped ½″ 302 stainless steel balls in a metal cup. A fourth rotating stainless steel ball of the same diameter is then pressed into contact with the three stationary balls by an adjustable loading arm. In the test employed in this application, the lubricant was added to the metal cup to a depth sufficient to immerse the three stationary balls, and the rotatable ball was rotated at a speed of 600 r.p.m. for one hour at room temperature under a load of either 10 kg. or 20 kg. The contact points between the rotatable ball and the three stationary balls grow to circular scars as wear progresses. The average diameter of these scars in millimeters after a one hour run or two hour run is taken as the measurement of wear. The better the lubricity of a fluid, the lower is the wear scar.

The following examples are illustrative of the practice of my invention and are not intended for purposes of limitation. All parts are by weight.

EXAMPLE 1

A mixture was prepared of 195.5 g. (1.7 moles) of methyl hydrogen dichlorosilane, 38.3 g. (0.20 mole) of methylchloropropyldichlorosilane, and 12.0 g. (0.10 mole) trimethylcholrosilane. This mixture was slowly added to about a liter of ice water and the mixture was stirred for one hour and then allowed to separate into two phases. The upper silicone phase was separated and washed four times with water to remove acid by-products and then dried over sodium sulfate to produce a liquid siilcone within the scope of Formula 3 in which $a$ is 4, $b$ plus $c$ is 34, and $n$ is 3. To this fluid was then added sufficient chloroplatinic acid hexahydrate to provide $1.5 \times 10^{-6}$ g. platinum and the reaction mixture was heated to 50° C. At this time, 294 g. (1.5 moles) tetradecene-1 was added at a rate sufficient to keep the reaction temperature at about 50° C. This resulted in a fluid within the scope of Formula 4 where R is tetradecyl, $n$ is 3, $a$ is 4, $b$ is 30, and $c$ is 4. To this fluid was then added 64.6 g. (0.2 mole) of monoacid di-2-ethylhexyl orthophosphate which reacted with the remaining hydrogen to produce a silicone fluid within the scope of Formula 1 in which R is tetradecyl, $n$ is 3, $m$ is 8, $a$ is 4, $b$ is 30, and $c$ is 4. The fluid prepared in this example was a clear-to-yellow liquid having a viscosity at 77° F. of 284 centistokes, at 100° F. of 91 centistokes, and at 210° F. of 34 centistokes. The refractive index $n_D^{25}$ of the fluid was 1.4537 and the density $d_4^{25}$ was 0.898. When this fluid was evaluated in the Shell Four-Ball Wear test under a load of 10 kg. and ambient temperature for one hour, the wear scar was 0.40 mm. Under the same conditions except with a 20 kg. load, the wear scar was 0.48 mm.

EXAMPLE 2

Following the procedure of Example 1, Fluid A, a trimethylsilyl chain-stopped methyl hydrogen polysiloxane methylchloropropylpolysiloxane, was prepared by reacting 5.83 g. trimethylchlorosilane, 19.1 g. methylchloropropyldichlorosilane, and 103.5 g. methyl hydrogen dichlorosilane and then adding 127.5 g. of tetradecene to the hydrolysis and condensation product. This resulted in a composition within the scope of Formula 4 in which $n$ was equal to 3, R is tetradecyl, $a$ has a value of 4, $b$ has a value of 26, and $c$ has a value of 10. By the procedure of Example 1, 80.5 g. of monoacid di-2-ethylhexyl orthophosphate was added to the remaining silicon hydrogen linkages to produce a product within the scope of Formula 1 in which all of the substituents and subscripts are as previously described, and $m$ has a value of 8 and the $$C_mH_{2m+1}$$

radical represents the 2-ethylhexyl radical. Following the same procedure, Fluids B and C, other trimethylsilyl chain-stopped copolymers of methylchloropropylsiloxane units, methyltetradecylsiloxane units, and methyl-bis-2-ethylhexyl phosphono units, were prepared in which the sum of $a$ plus $b$ plus $c$ was equal to 40 and in which the various siloxane units were present in the mole ratios illustrated in Table I below. Also shown in Table I is a control which consists entirely of methyltetradecylsiloxane units, and methylchloropropylsiloxane units of the type described in my aforementioned copending application Ser. No. 600,768 (Docket 8DW-405).

TABLE I

| Fluid | $(CH_3)(C_{14}H_{29})SiO$ | $(CH_3)(ClC_3H_6)SiO$ | $(CH_3)R''P(O)OSiO$ |
|---|---|---|---|
| A | 65 | 10 | 25 |
| B | 87 | 10 | 3 |
| C | 50 | 40 | 10 |
| Control | 80 | 20 | 0 |

Each of the fluids described in the above Table I, together with the fluid of Example 1, were examined in the Four-Ball Wear test employing ambient temperature and a test which ran for one hour. In Table II below are shown the wear scars after test at loads of 10 kg. and 20 kg. The data for the fluid of Example 1 are included for comparison.

TABLE II

| Fluid | Wear Scar, 10 kg. | Wear Scar, 20 kg |
|---|---|---|
| Example 1 | 0.40 | 0.48 |
| A | 0.41 | 0.51 |
| B | 0.47 | 0.65 |
| C | 0.40 | 0.50 |
| Control | | (¹) |

¹ Torn, cannot run.

As shown by the above data, the fluids of Example 1 and fluids A, B, and C all exhibit satisfactory wear scars at loads of 10 kg. and 20 kg. The table also shows that the control had a satisfactory wear scar at 10 kg. but is torn and cannot run under the more extreme pressure load.

EXAMPLE 3

Following the procedure of earlier examples, 21.7 g. (0.2 mole) of trimethylchlorosilane, 46.6 g. (0.2 mole) methylchlorohexyldichlorosilane, and 69 g. (0.6 mole) of methyl hydrogen dichlorosilane were mixed and added to 350 g. of ice water which was maintained with stirring for one hour. At the end of this time, the hydrolysis and condensation product was separated by means previously described, 44.8 g. (0.4 mole) octene-1 was added to the hydrolysis and condensation product and then 31 g. (0.2 mole) monoacid diethylphosphate was added to the remaining silicon-hydrogen linkages to form a product within the scope of Formula 1 in which R is octyl, $n$ has a value of 6, $m$ has a value of 2, $a$ has a value of 2.0, $b$ has a value of 4.0, and $c$ has a value of 2.0. This product is a clear yellowish liquid which has extreme pressure lubricating characteristics.

In order to demonstrate the flame-resistant characteristics of each of the fluid of Examples 1 and 3 and fluids A, B, and C of Example 2, a standard pipe cleaner was soaked in each of the fluids and the pipe cleaner was held in a gas flame. In no instance would the fluid burn nor would the presence of the fluid permit the pipe cleaner to burn.

The fluids of the present example are extremely valuable in applications in which the broad useful temperature range of silicone lubricant is desired and is particularly useful where extreme pressure lubricating characteristics are required in preventing failure of mechanical parts which are subject to sliding friction. The materials are especially useful for lubricating stainless steel parts, which are extremely difficult to lubricate with conventional materials and, in addition, are useful in the lubrication of many other metal surfaces. The materials are especially useful where the combination of extreme pressure lubrication and flame retardancy are required.

In addition to using the compositions of the present invention as the sole lubricant for imparting improved extreme pressure lubrication characteristics to sliding surfaces, it should be understood that these compositions are useful as additives for more conventional lubricating compositions. For example, these compositions can be employed in amounts of from 5 to 20 percent by weight as additives for other types of organopolysiloxane, such as methyltetradecylpolysiloxane fluids. In addition, these compositions also improve the lubricating characteristics of ordinary hydrocarbon lubricants, such as conventional mineral oil lubricants. These compositions can also be thickened with fillers, such as silica, to provide flame resistant, extreme pressure lubricating greases.

While the foregoing examples have illustrated many of the embodiments of my invention, it should be understood that my invention relates broadly to the class of compounds described which are copolymers of methylchloroalkylsiloxane units, methyl higher alkylsiloxane units and methyldialkylphosphonosiloxane units, all of which are trimethylsilyl chain-stopped. The scope of my invention is defined more fully in the appended claims.

What I claim as new and desire to secure by Letters Patent of the United States is:

1. A liquid organopolysiloxane of improved lubricating characteristics having the formula:

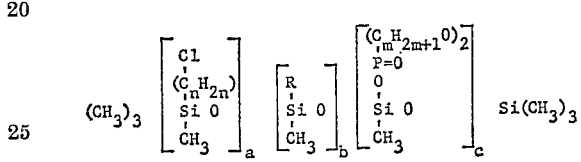

where R is an alkyl radical containing at least 8 carbon atoms, $n$ is an integer equal to from 2 to 6, inclusive, $m$ is an integer equal to from about 2 to 10, inclusive, the sum of $a$ plub $b$ plus $c$ is equal to from about 4 to 40, inclusive, the ratio of $a$ over $a$ plus $b$ plus $c$ is equal to from 0.10 to 0.40, inclusive, the ratio of $b$ over $a$ plus $b$ plus $c$ has an average value of from 0.50 to 0.88, inclusive, and the ratio of $c$ over $a$ plus $b$ plus $c$ has an average value of from 0.03 to 0.25, inclusive.

2. A composition of claim 1 in which R is tetradecyl.
3. A composition of claim 1 in which $n$ is equal to 3.
4. A composition of claim 1 in which $m$ has a value of 8.
5. A composition of claim 1 in which R is tetradecyl, $n$ has a value of 3, and $m$ has a value of 8.

References Cited

UNITED STATES PATENTS

| | | | |
|---|---|---|---|
| 2,488,449 | 11/1949 | Trautman | 260—448.2 XR |
| 2,843,615 | 7/1958 | Linville | 260—448.2 XR |
| 2,995,594 | 8/1961 | Fekete | 260—448.2 XR |
| 2,996,530 | 8/1961 | Fekete | 260—448.2 XR |
| 3,019,248 | 1/1962 | Fekete | 260—448.2 XR |
| 3,122,581 | 2/1964 | Pike | 260—448.2 XR |
| 3,164,622 | 1/1965 | Newlands | 260—448.2 |
| 3,346,492 | 10/1967 | Hess | 260—448.2 XR |
| 3,354,189 | 11/1967 | Revukas | 260—448.2 XR |
| 3,385,822 | 5/1968 | Brown | 260—448.2 XR |

TOBIAS E. LEVOW, *Primary Examiner.*

J. P. PODGORSKI, *Assistant Examiner.*

U.S. Cl. X.R.

252—49.6, 49.9